(12) United States Patent
Lee (10) Patent No.: US 7,330,293 B2
(45) Date of Patent: Feb. 12, 2008

(54) OPTICAL SCANNING UNIT

(75) Inventor: Yu-yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/960,028

(22) Filed: Oct. 8, 2004

(65) Prior Publication Data

US 2005/0122554 A1 Jun. 9, 2005

(30) Foreign Application Priority Data

Dec. 5, 2003 (KR) ............ 10-2003-0087982

(51) Int. Cl.
*G02B 26/08* (2006.01)
(52) U.S. Cl. ..................... 359/196; 359/212
(58) Field of Classification Search ........ 359/196, 359/212–215
See application file for complete search history.

(56) References Cited

U.S. PATENT DOCUMENTS

| | | | | |
|---|---|---|---|---|
| 4,429,948 A | * | 2/1984 | Garwin | 359/217 |
| 4,960,312 A | | 10/1990 | Razzaghi | 350/3.71 |
| 5,074,646 A | | 12/1991 | Huang et al. | 359/572 |
| 5,134,513 A | * | 7/1992 | Morimoto | 359/212 |
| 5,327,280 A | * | 7/1994 | Morimoto | 359/216 |
| 5,701,190 A | * | 12/1997 | Mochizuki et al. | 359/205 |
| 7,142,340 B2 | * | 11/2006 | Hubby, Jr. | 359/216 |

FOREIGN PATENT DOCUMENTS

| | | |
|---|---|---|
| JP | 61-156217 | 7/1986 |
| JP | 2-188714 | 7/1990 |
| JP | 05-019193 | 1/1993 |
| JP | 7-253514 | 10/1995 |

* cited by examiner

*Primary Examiner*—Euncha P. Cherry
(74) *Attorney, Agent, or Firm*—Roylance, Abrams, Berdo & Goodman, L.L.P.

(57) ABSTRACT

An optical scanning unit designed to provide a sufficient optical path length between a light source and an exposed object while reducing the overall space it occupies. The optical scanning unit may include a light source that produces and emits at least one beam, a beam deflector that deflects and scans the beam emitted by the light source in main scanning direction of an exposed object, and a planar optical system (POS) that is disposed in an optical path between the light source and the exposed object. The POS is designed to maintain a sufficient optical path length of an incident beam while reducing the space occupied by the optical scanning unit.

18 Claims, 7 Drawing Sheets

OPTICAL SCANNING UNIT

CROSS-REFERENCE TO RELATED APPLICATIONS

This application claims the benefit under 35 U.S.C §119 (a) of Korean Patent Application No. 2003-87982, filed on Dec. 5, 2003, in the Korean Intellectual Property Office, the entire disclosure of which is incorporated herein by reference.

BACKGROUND OF THE INVENTION

1. Field of the Invention

The present invention relates to an optical scanning unit that scans a beam emitted by a light source onto an exposed object. More particularly, the present invention relates to an optical scanning unit designed to provide sufficient optical path length between a beam deflector and an exposed object while reducing the space taken up by the overall unit.

2. Description of the Related Art

Typically, an optical scanning unit is used for a laser printer, a digital copier, a facsimile, or the like to produce a latent image on an exposed object through main scanning by a beam deflector and subscanning by rotation of the exposed object.

Figure 1:
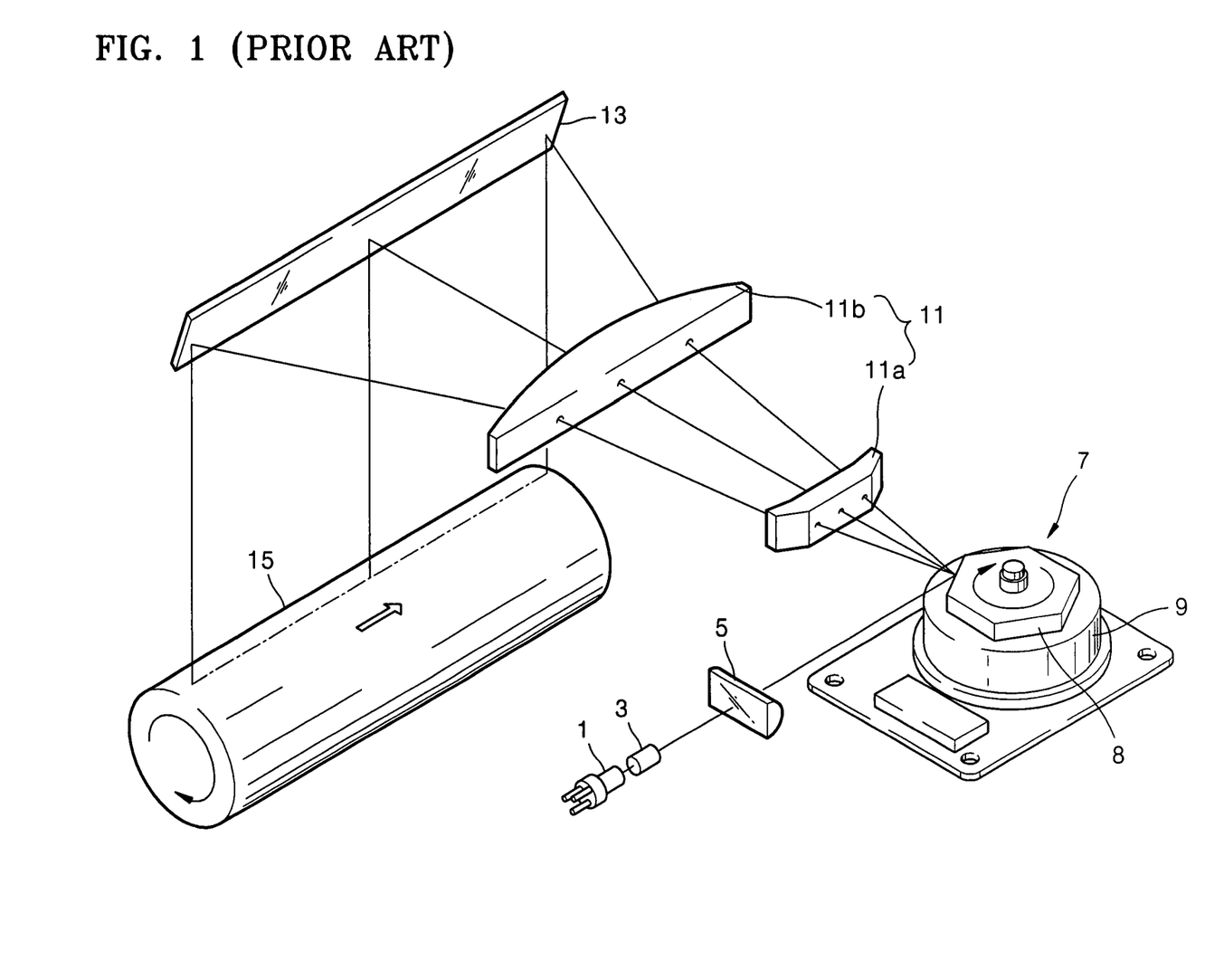
FIG. 1 is a perspective view schematically showing the optical arrangement of a conventional optical scanning unit.
Figure 2:
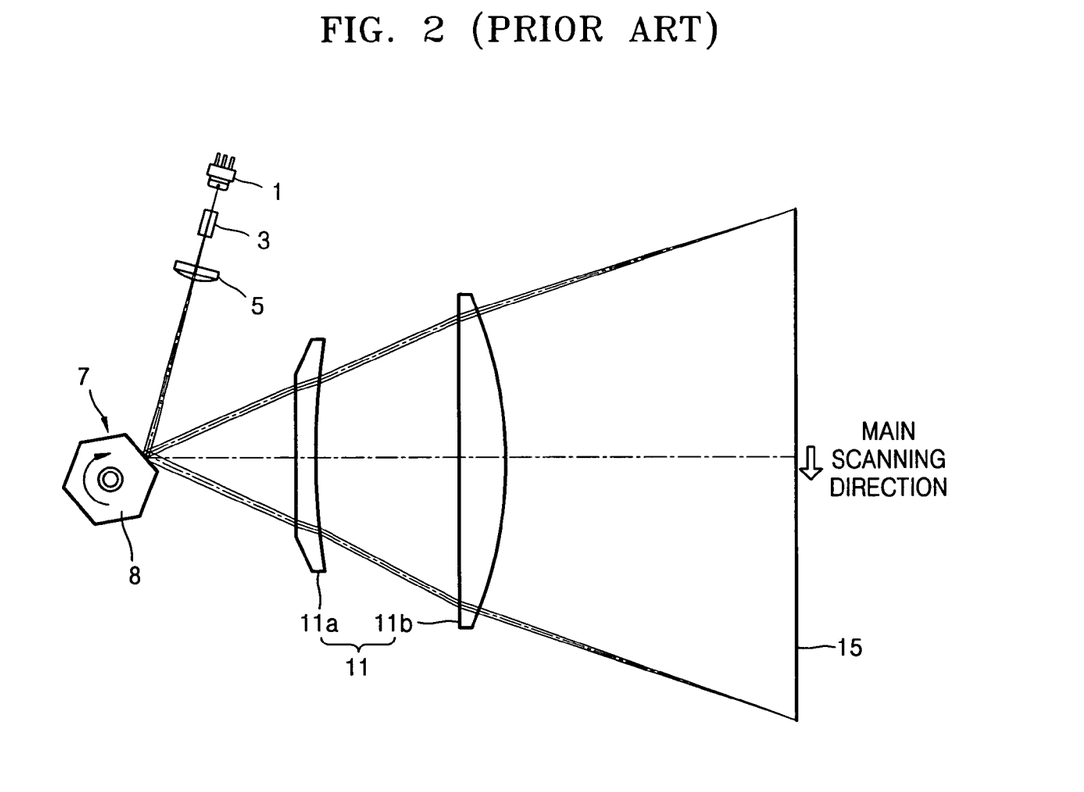
FIG. 2 is a top view of the optical scanning unit of FIG. 1.
Figure 3:
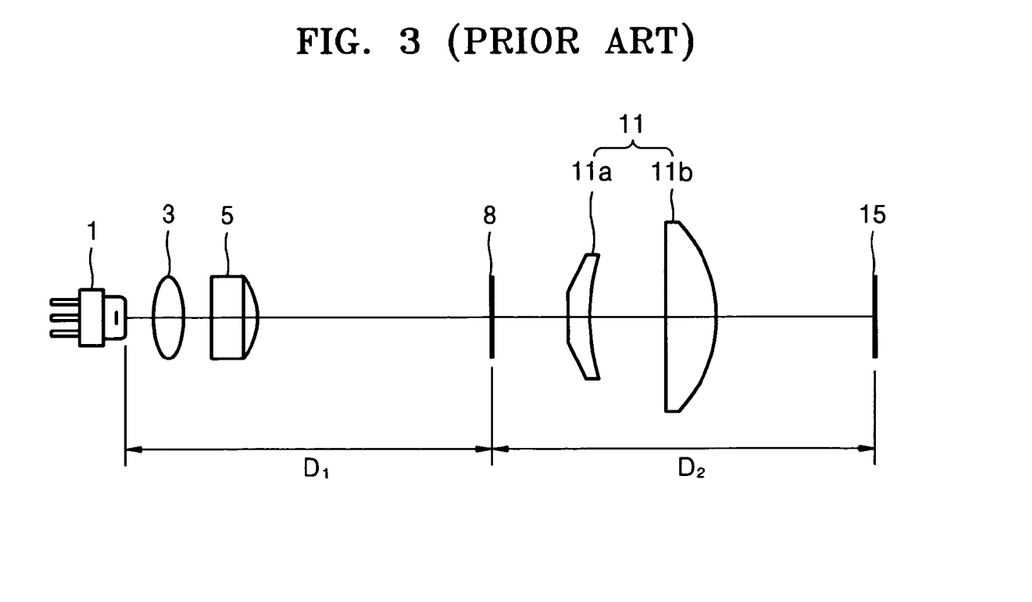
FIG. 3 is a schematic unfolded view of the optical path shown in FIG. 1.

Referring to FIGS. 1-3, a conventional optical scanning unit includes a light source 1 that produces and emits a beam, a beam deflector 7 that deflects the beam emitted by the light source 1 to be scanned onto an exposed object 15 in the main scanning direction, and an f-θ lens 11 that corrects an error contained in the beam deflected by the beam deflector 7. In addition, a collimating lens 3 that collects the divergent beam from the light source 1 and a cylindrical lens 5 that shapes the beam are located in an optical path between the light source 1 and the beam deflector 7, and a mirror member 13 that changes the direction of the scanned beam may be disposed between the f-θ lens 11 and the exposed object 15.

The beam deflector 7 consists of a driving source 9 and a rotating polygonal mirror 8 rotated by the driving source 9. The direction in which a beam emitted by the light source 1 is scanned is determined according to the reflection direction of the beam, which changes as the rotating polygonal mirror 8 rotates. Thus, when the rotating polygonal mirror 8 rotates clockwise, the beam incident on the rotating polygonal mirror 8 is scanned onto the exposed object 15 in the main scanning direction as indicated by an arrow.

The f-θ lens 11 is comprised of two lenses 11a and 11b. While one lens 11a compensates for any astigmatism present in the beam deflected by the beam deflector 7, the other lens 11b focuses the scanned beam and corrects the beam so that scanning lines are equiangular and equally spaced.

The optical scanning unit configured above has to provide an optical path D1 of sufficient length between the light source 1 and the beam deflector 7 since multiple optical components are arranged between them. Furthermore, it must provide an optical path D2 of sufficient length between the beam deflector 7 and the exposed object 15 since the beam deflected by the beam deflector 7 is incident on the entire main scanning area of the exposed object 15. However, since the overall size of the optical scanning unit increases in order to satisfy the above requirements, there is an insufficient space to install it when used in printing equipment and the main body of the printing equipment may become bulky.

SUMMARY OF THE INVENTION

The present invention provides an optical scanning unit employing a planar optical system (POS) designed to provide a sufficient optical path length between a light source and an exposed object and reduce the overall space occupied by the optical scanning unit.

According to an aspect of the present invention, there is provided an optical scanning unit including a light source, a beam deflector, and a POS. The light source produces and emits at least one beam. The beam deflector deflects and scans the beam emitted by the light source in the main scanning direction of the exposed object. The POS is disposed in an optical path between the light source and the exposed object. The POS is designed to maintain a sufficient optical path length of an incident beam while reducing the space occupied by the optical scanning unit.

Here, the POS is disposed in an optical path between the light source and the beam deflector and or between the beam deflector and the exposed object and includes a reflecting mirror, that reflects the incident beam one or more times and one or more planar optical components that are disposed in an optical path of the beam reflected by the reflecting mirror and reflect the incident beam back to the reflecting mirror.

The optical scanning unit may further include an f-θ lens that corrects the beam deflected by the beam deflector at different magnifications for the main scanning direction and the subscanning direction so that the corrected beam is focused onto the exposed object.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 4:
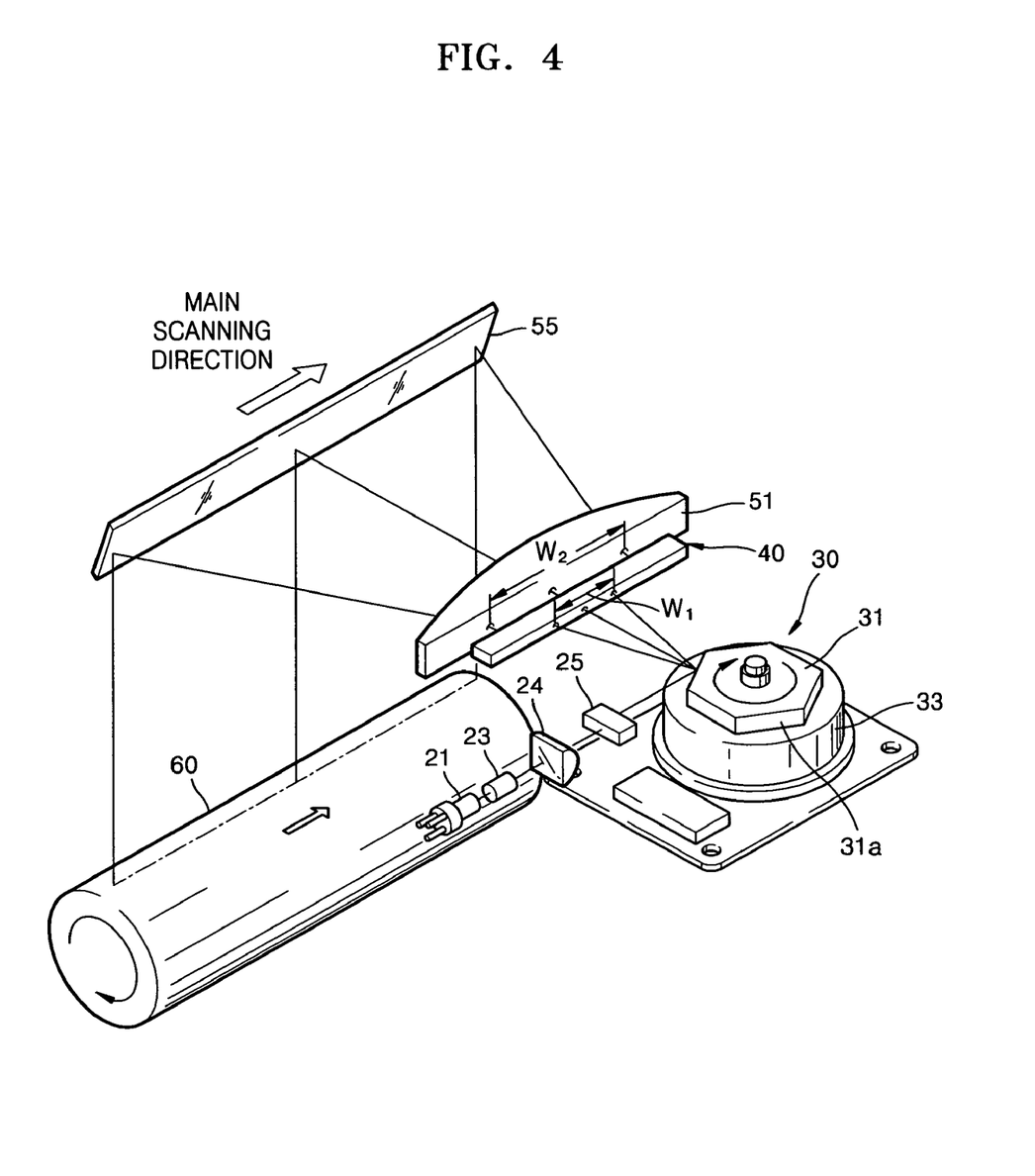
FIG. 4 is a perspective view schematically showing the optical arrangement of an optical scanning unit according to a first embodiment of the present invention.
Figure 5:
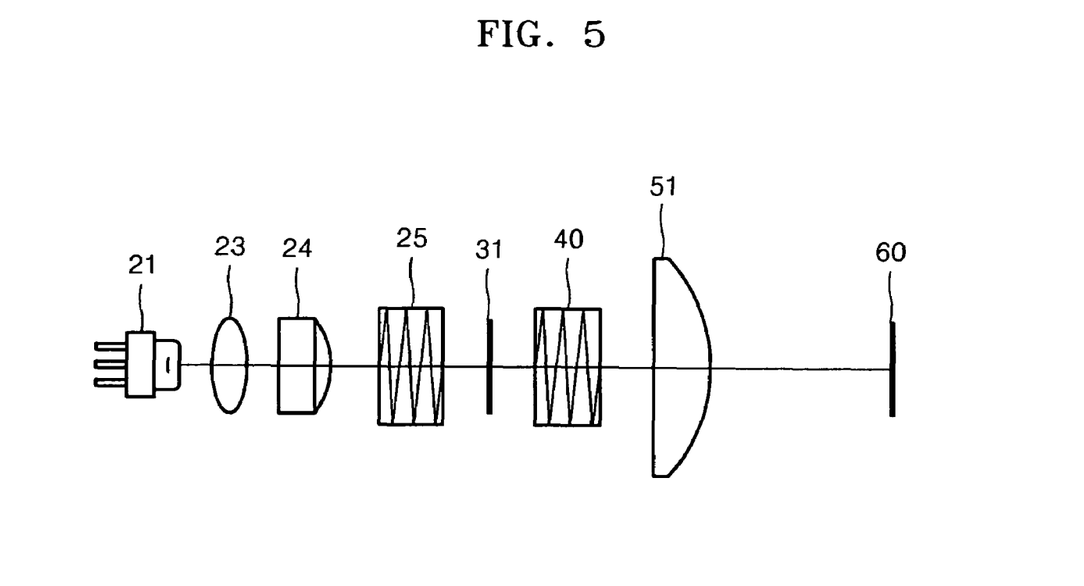
FIG. 5 is a schematic unfolded view of the optical path shown in FIG. 4.

Referring to FIGS. 4 and 5, an optical scanning unit according to a first embodiment of the present invention includes a light source 21 that emits at least one beam, a beam deflector 30 that deflects and scans the beam emitted by the light source 21, an f-θ lens 51, and a planar optical system (POS) that is disposed between the light source 21 and the exposed object 60. The f-θ lens 51 corrects the beam deflected by the beam deflector 30 at different magnifications along main scanning direction and subscanning direction for focusing on an exposed object 60. The POS is designed to secure an optical path length of an incident beam while reducing the space occupied. In addition, a reflecting element 55 that changes the path of a scanned beam may be disposed between the f-θ lens 51 and the exposed object 60.

The light source 21 optically modulates the beam such that the beam is emitted only onto a portion of the exposed object 60 on which a latent image will be formed. The light source 21 may be constructed as an edge emitting laser diode, a vertical cavity surface emitting laser (VCSEL), or a light-emitting diode (LED). Since the construction of the light source 21 is well known in the art, a detailed explanation thereof will not be given.

Preferably, the optical scanning unit further includes a collimating lens 23 and at least one cylindrical lens 24 in an optical path between the light source 21 and the beam deflector 30. The collimating lens 23 preferably collimates the divergent beam emitted by the light source 21 into a parallel or convergent beam. The cylindrical lens 24 preferably focuses an incident beam onto the beam deflector 30 differently for the main scanning direction and the subscanning direction. Here, the subscanning direction refers to the direction that the exposed object 60 rotates, and the main scanning direction refers to an axial direction of the exposed object 60, which is the direction in which the beam is deflected by the beam deflector 30. The POS is disposed in optical paths between the light source 21 and the beam deflector 30 and or between the beam deflector 30 and the exposed object 60.

In the illustrative embodiment, the POS includes first and second POS's 25 and 40. In this case, the first POS 25 is disposed between the light source 21 and the beam deflector 30 and serves to secure an optical path between them and reduce the space occupied. More specifically, to decrease the physical space between the light source 21 and the beam deflector 30 while providing the entire optical path length needed, the first POS 25 reflects an incident beam toward the beam deflector 30 in a plane many times in a different direction from that in which the beam is emitted from the light source 21.

Also, the second POS 40 is disposed in an optical path between the beam deflector 30 and the f-θ lens 51 and serves to secure an optical path between them and reduce the space occupied. Thus, as shown in FIG. 4, while a width W1 between front and rear edges of the incident scanned beam on an entrance face of the second POS 40 is small, a width W2 between the front and rear edges of the scanned beam on the exit face can be increased so that it corresponds to the effective area on an entrance face of the f-θ lens 51. That is, the second POS 40 is designed to provide a long optical path compared to a width of the incident beam in the direction of propagation.

Figure 6:
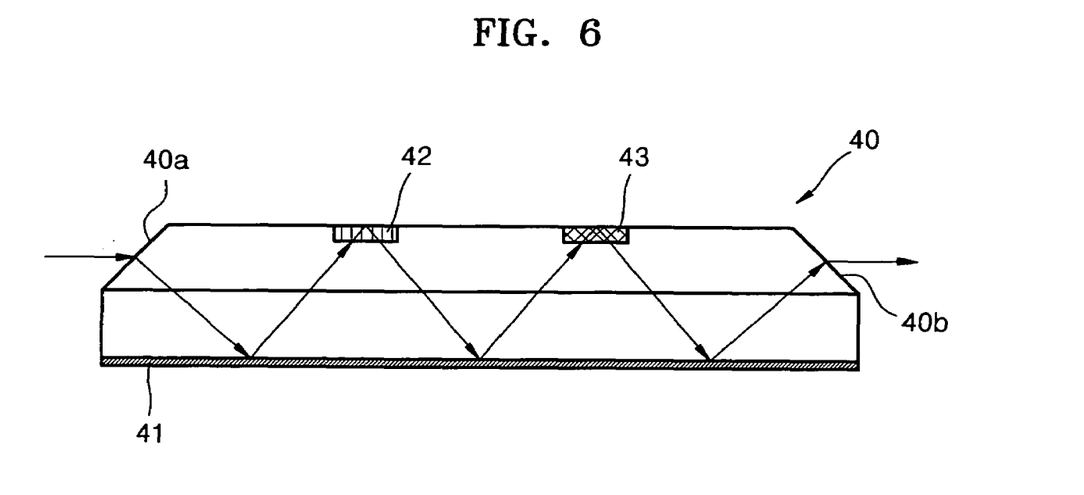
FIG. 6 illustrates the planar optical system (POS) shown in FIG. 4.

Referring to FIG. 6, the second POS 40 includes a reflecting mirror 41 that changes the path of an incident beam and planar optical components 42 and 43 that reflect the beam reflected from a portion of the reflecting mirror 41 back to different locations on the reflecting mirror 41. In addition, the second POS 40 has an entrance face 40a through which the incident scanned beam is refracted toward the reflecting mirror 41 and an exit face 40b through which the exiting scanned beam is refracted. The POS's 42 and 43 are respectively disposed to secure an optical propagation path of the scanned beam and can be constructed of reflecting mirrors that simply reflect the incident beam.

Figure 7:
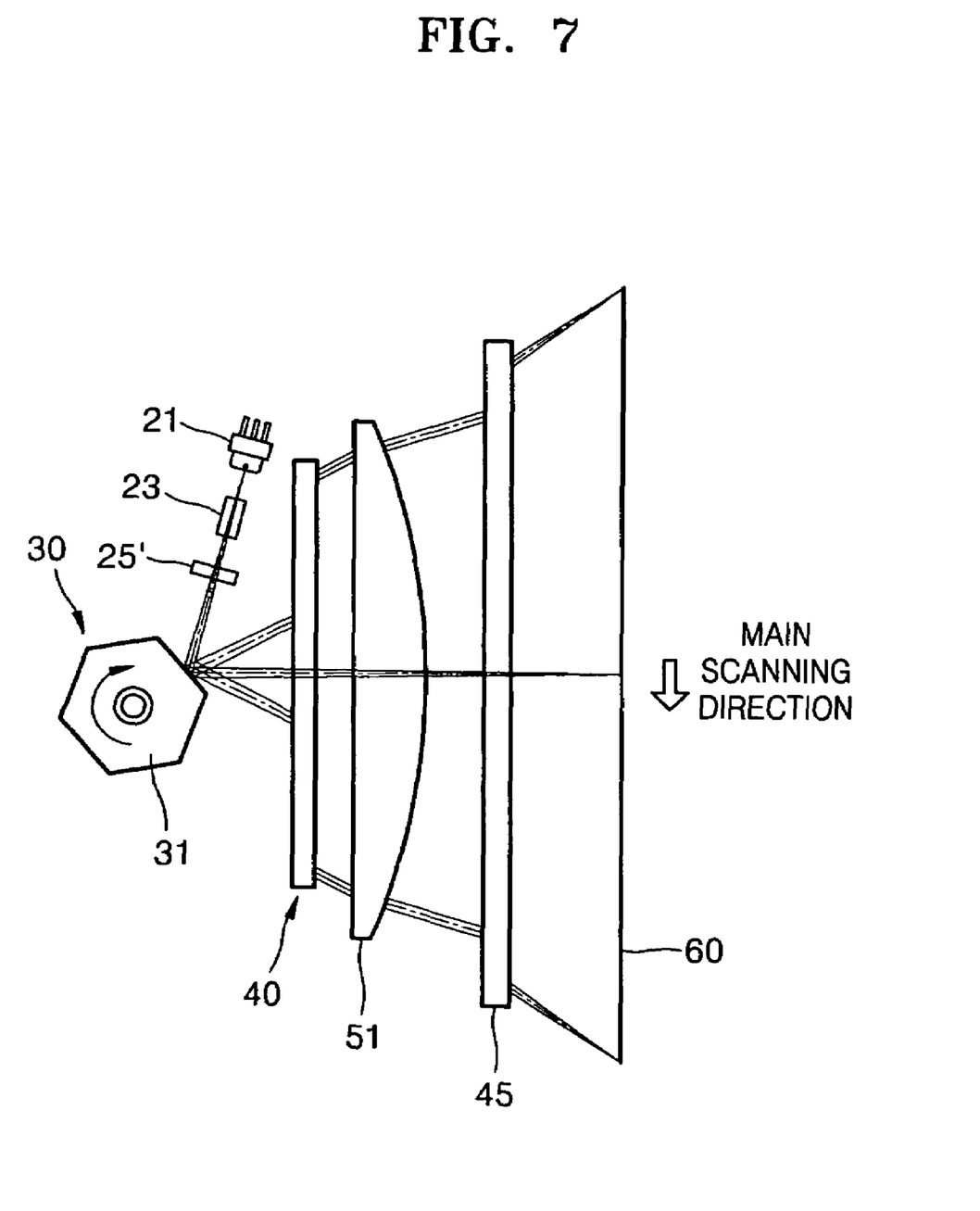
FIG. 7 is a schematic top view of an optical scanning unit according to a second embodiment of the present invention.
Figure 8:
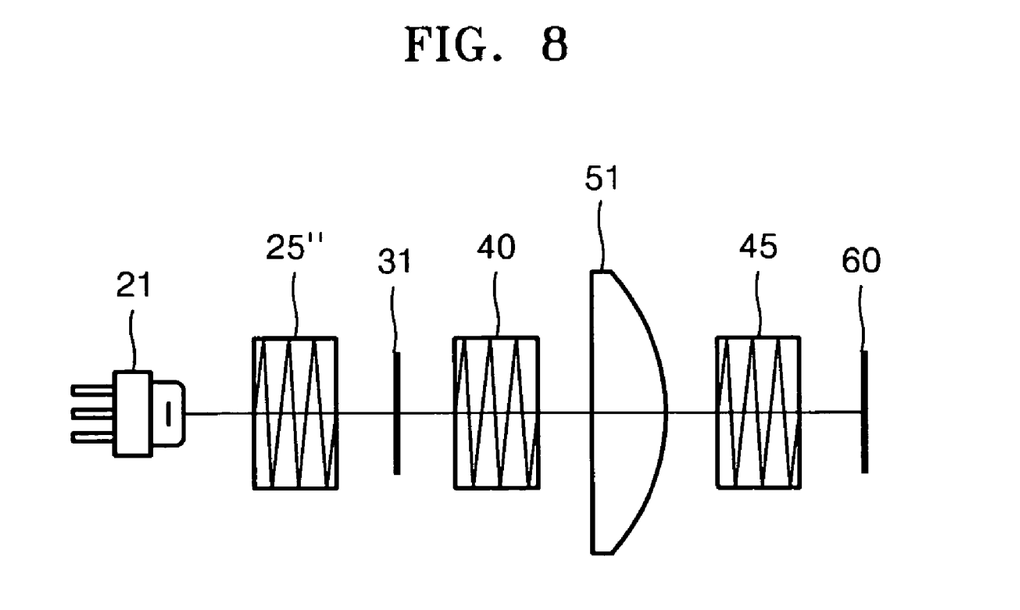
FIG. 8 is a schematic unfolded view of an optical path in an optical scanning unit according to a third embodiment of the present invention.
Figure 9:
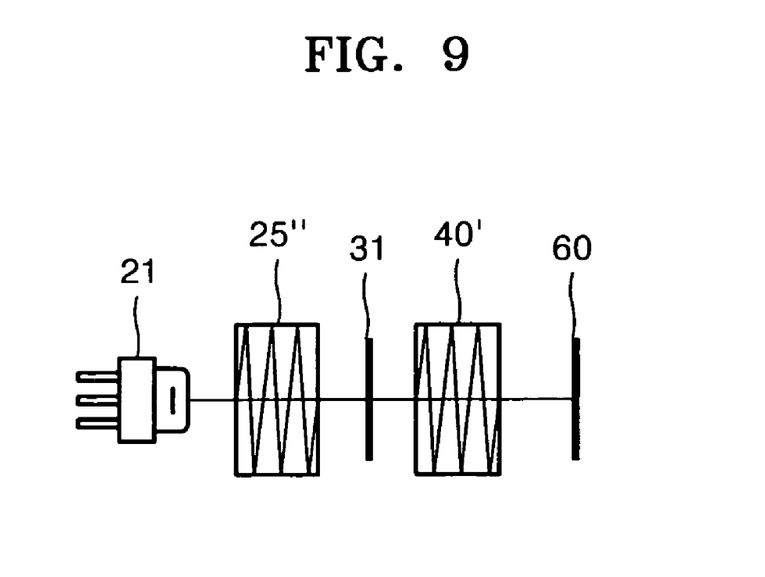
FIG. 9 is a schematic unfolded view of an optical path in an optical scanning unit according to a fourth embodiment of the present invention.

When used in first POS's 25' and 25" and a second POS 40' configured as shown in FIGS. 7-9, respectively, the POS's 42 and 43 serve as a collimating lens, a cylindrical lens, and/or an f-θ lens. The planar optical components 42 and 43 are realized by lithography and etching technologies. Since the construction thereof is well known in the art, a detailed explanation will not be given.

A detailed description of the first POS 25 is not needed because it has substantially the same construction as the second POS 40 of FIG. 6 except for its width in that both POS's 25 and 40 include reflecting mirrors and planar optical components, respectively.

Turning to FIG. 4, the beam deflector 30 deflects and scans a beam, which has been emitted by the light source 21 and passed through the collimating lens 23, the cylindrical lens 24, and the first POS 25, in the main scanning direction of the exposed object 60 as indicated by an arrow. The beam deflector 30 includes a driving source 33 and a rotating polygonal mirror 31 moved by the driving source 33 in either a clockwise or counterclockwise direction. The rotating polygonal mirror 31 has a plurality of reflecting surfaces 31a on its sidewalls. When the rotating polygonal mirror 31 rotates, the angle of the reflecting surface 31a with respect to an incident beam changes, so that the incident beam is scanned in the main scanning direction. The structure of the beam deflector 30 is not limited to the rotating polygonal mirror structure as shown in FIGS. 4 and 5. For example, the beam deflector 30 may be configured with a hologram disc that diffracts and deflects the incident beam.

The f-θ lens 51 corrects the beam deflected by the beam deflector 30 at different magnifications in the main scanning and subscanning directions so that the beam is focused onto the exposed object 60. The f-θ lens 51 is comprised of an aspheric lens having different radii of curvature in the main scanning direction and the subscanning direction. The f-θ lens 51 is preferably made from a plastic material. The exposed object 60 is a medium exhibiting the difference (the potential difference, for example) between a portion exposed by a beam and a non-exposed portion. The exposed object 60 may be a photoreceptor drum or belt.

Due to the presence of a first and or a second POS in an optical path as described above, it is possible to provide an optical path length needed for scanning a beam while reducing the spaces between the light source 21 and the beam deflector 30 and or between the beam deflector 30 and the f-θ lens 51. Thus, when the optical scanning unit according to the first embodiment of the present invention is employed in printing equipment, it is possible to reduce the space used by the optical scanning unit. This permits a greater degree of freedom in the installation of the optical scanning unit, which helps reduce the overall size of the printing equipment.

Referring to FIG. 7, an optical scanning unit according to a second embodiment of the present invention includes a light source 21, a beam deflector 30, an f-θ lens 51, and a first through third POS's 25', 40, and 45, respectively that are disposed between the light source 21 and the exposed object 60. The POSs are designed to secure an optical path length of an incident beam while reducing the space occupied. The optical scanning unit further includes a collimating lens 23 in the optical path between the light source 21 and the beam deflector 30.

The optical scanning unit of the second embodiment differs from the first embodiment described with reference to FIGS. 4-6 in that the first POS 25' has the same function as the cylindrical lens (24 of FIG. 4) and it further includes the third POS 45 disposed in an optical path between the f-θ lens 51 and the exposed object 60. Since the remaining components have substantially the same construction as their counterparts in the first embodiment, a detailed explanation thereof will not be given.

The first POS 25' is constructed such that at least one of its planar optical components serves as a cylindrical lens. In this case, the planar optical component 25' serving as a cylindrical lens focuses the incident beam onto the beam deflector 30 differently for the main scanning direction and the subscanning direction.

The third POS 45 is disposed between the f-θ lens 51 and the reflecting element 55 and designed to secure an optical path between them while reducing the space occupied. The third POS 45 has substantially the same construction as the second POS 40 except for its width in that both systems 45 and 40 include reflecting mirrors and planar optical components, respectively, so a detailed explanation thereof will not be given.

Employing the first through third POS's 25', 40, and 45, respectively, in the optical path makes it possible to reduce the overall size of the optical scanning unit by decreasing the space used by these optical systems 25', 40, and 45. Furthermore, since the first POS 25' serves as a cylindrical lens as well, it is possible to simplify the construction of the optical scanning unit.

Referring to FIG. 8, an optical path in an optical scanning unit according to a third embodiment of the present invention differs from the second embodiment described with reference to FIG. 7 in that a first POS 25" serves as both the collimating lens (23 of FIG. 7) and the cylindrical lens (24 of FIG. 4). The remaining components have substantially the same constructions as their counterparts in the second embodiment, so a detailed explanation will not be given. In this case, the first POS 25" is designed such that its planar optical components function as collimating lens and cylindrical lens. The planar optical components of the first POS 25" serves as a lens by forming a predetermined rotating pattern on a plane using lithography and etching technologies. Since the formation technologies are well known in the art, a detailed explanation thereof will not be given.

Referring to FIG. 9, an optical path in an optical scanning unit according to a fourth embodiment of the present invention differs from the third embodiment described with reference to FIG. 8 in that a second POS 40' serves the functions of the second POS 40, the f-θ lens 51, and the third POS 45 shown in FIG. 8 simultaneously. The remaining components have substantially the same constructions as their counterparts in the third embodiment, so a detailed explanation will not be given. The second POS 40' is designed such that at least one of its planar optical components functions as an f-θ lens. Thus, the second POS 40' serves to correct the beam deflected by the beam deflector 30, shown in FIG. 7, at different magnifications for the main scanning direction and the subscanning direction so that the corrected beam is focused onto the exposed object 60.

Figure 10:
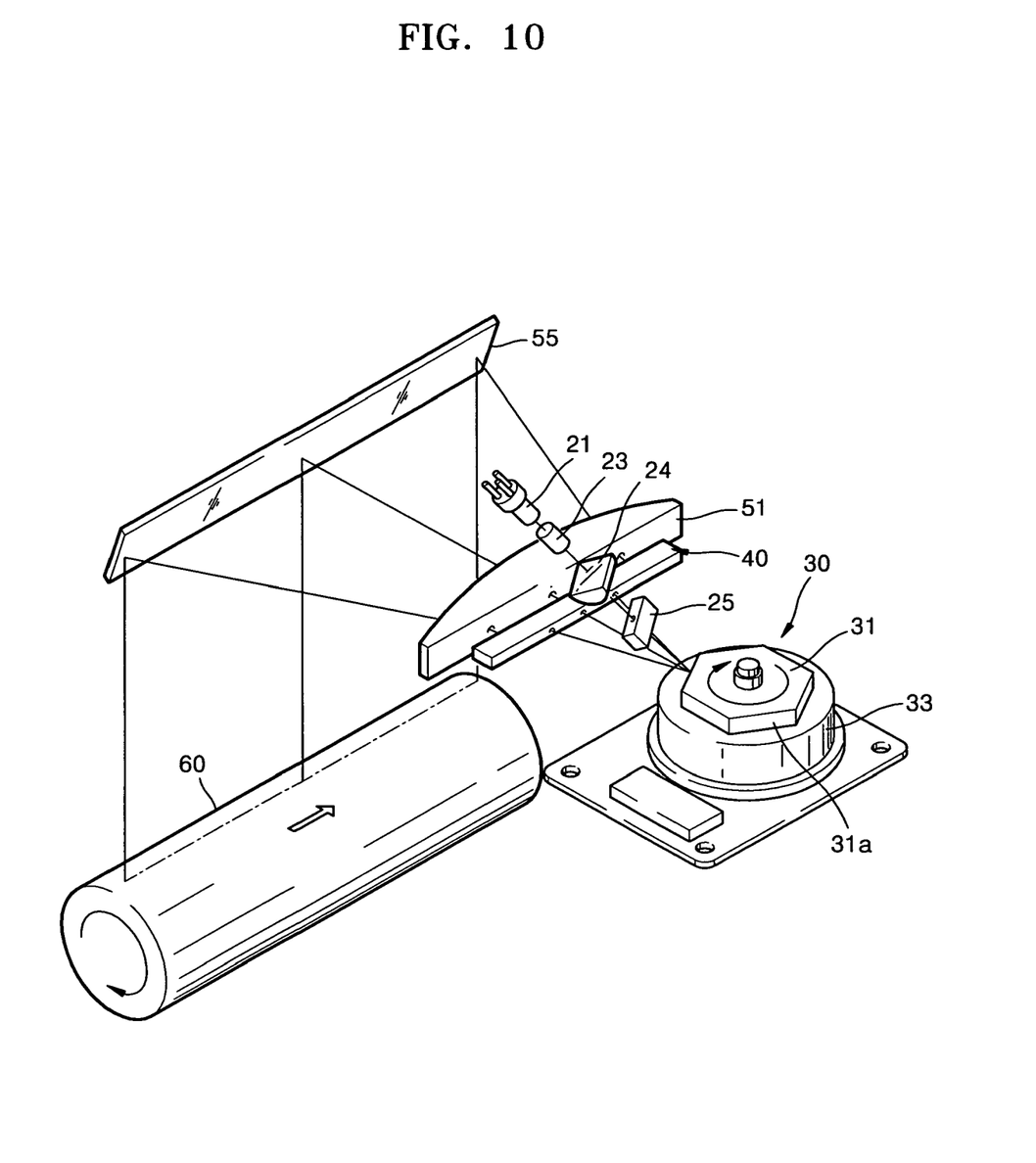
FIG. 10 is a perspective view schematically showing the optical arrangement of an optical scanning unit according to a fifth embodiment of the present invention.

Referring to FIG. 10, an optical scanning unit according to a fifth embodiment of the present invention differs from that of the first embodiment described with references to FIGS. 4-6 in the arrangement of the optical path between the light source 21 and the beam deflector 30. The remaining components have substantially the same constructions as their counterparts in the first embodiment, so a detailed explanation will not be given. That is, the light source 21, the collimating lens 23, the cylindrical lens 24, and the first POS 25 are located at an upper portion of a plane formed by a beam deflected and scanned by the beam deflector 30. In this case, the same components may be located at a lower portion thereof. In the illustrative embodiment, the width of the optical scanning unit can be reduced by changing the optical arrangement in this way.

The optical scanning unit according to embodiments of the present invention is designed to have one or more POS's, thereby providing an optical path length needed for scanning a beam. Furthermore, the space between the light source 21 and the beam deflector 30 and or between the beam deflector 30 and the f-θ lens 51 is reduced.

Thus, when the optical scanning unit is employed in a printing device, it is possible to reduce the space used by the optical scanning unit, thereby permitting a large degree of freedom in the installation of and reducing the overall size of the printing device. Furthermore, it is possible to reduce the width of the optical scanning unit by positioning the light source at an upper or lower portion of a plane formed by a beam scanned by the beam deflector.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical scanning unit comprising:
   a light source that produces and emits at least one beam;
   a beam deflector that deflects and scans the beam emitted by the light source in a main scanning direction of an exposed object; and
   a planar optical system (POS) comprising an entrance face and an exit face that is disposed in an optical path between the light source and the exposed object and is adapted to secure an optical path length of an incident beam and to reduce the space occupied by the optical scanning unit, by reflecting the incidence beam in a plane a plurality of times in a different direction from that in which the beam is emitted from the light source, such that a difference between a first width (W1) between front and rear edges of the scanned beam entering the entrance face of the POS and a second width (W2) between front and rear edges of the scanned beam exiting the exit face of the POS is increased.

2. The optical scanning unit of claim 1, wherein the POS is disposed in an optical path between the light source and the beam deflector and or between the beam deflector and the exposed object.

3. The optical scanning unit of claim 2, wherein the POS comprises:
   a reflecting mirror that reflects the incident beam one or more times; and
   one or more planar optical components that are disposed in an optical path of the beam reflected by the reflecting mirror and reflect the incident beam back to the reflecting mirror,
   wherein the POS is designed to provide a long optical path compared to the width of the incident beam in the direction of propagation.

4. The optical scanning unit of claim 3, wherein the one or more planar optical components collect the incident beam in the main scanning direction and or subscanning direction.

5. The optical scanning unit of claim 1, further comprising an f-θ lens that corrects the beam deflected by the beam deflector at different magnifications along the main scanning direction and the subscanning direction for focusing on the exposed object.

6. The optical scanning unit of claim 5, wherein the f-θ lens is comprised of an aspheric lens having different radii of curvature in the main scanning direction and the subscanning direction.

7. The optical scanning unit of claim 5, wherein the POS is disposed in an optical path between the beam deflector and the f-θ lens and or between the f-θ lens and the exposed object.

8. The optical scanning unit of claim 1, further comprising one or more cylindrical lenses that are disposed between the light source and the beam deflector and focus an incident beam in a direction corresponding to the main scanning direction and or the subscanning direction.

9. The optical scanning unit of claim 1, further comprising a collimating lens that is disposed between the light source and the beam deflector and collimates a divergent beam emitted by the light source into a parallel or convergent beam.

10. The optical scanning unit of claim 1, wherein the light source is located at an upper or lower portion of a plane formed by the beam deflected and scanned by the beam deflector.

11. An optical scanning unit comprising:
a light source that produces and emits at least one beam;
a beam deflector that deflects and scans the beam emitted by the light source in a main scanning direction of an exposed object;
a first planar optical system (POS) that is disposed in an optical path between the light source and the beam deflector and designed to secure an optical path length of an incident beam while reducing the space occupied by the optical scanning unit; and
a second POS comprising an entrance face and an exit face that is disposed in an optical path between the beam deflector and the exposed object and is adapted to secure an optical path length of an incident beam and to reduce the overall space occupied by the optical scanning unit,
wherein the first and second POS comprise:
a reflecting mirror that reflects the incident beam one or more times; and
one or more planar optical components that are disposed in an optical path of the beam reflected by the reflecting mirror and reflect the incident beam back to the reflecting mirror,
wherein the POS is designed to provide a long optical path compared to the width of the incident beam in the direction of propagation; and
wherein a difference between a first width (W1) between front and rear edges of the scanned beam entering the entrance face of the second POS and a second width (W2) between front and rear edges of the scanned beam exitng the exit face of the second POS is increased.

12. The optical scanning unit of claim 11, further comprising one or more cylindrical lenses that are disposed between the light source and the beam deflector and focus an incident beam in a direction corresponding to the main scanning direction and or subscanning direction.

13. The optical scanning unit of claim 11, wherein the first POS collects the incident beam in the main scanning direction and or subscanning direction.

14. The optical scanning unit of claim 11, further comprising a collimating lens that is disposed between the light source and the beam deflector and collimates a divergent beam emitted by the light source into a parallel or convergent beam.

15. The optical scanning unit of claim 11, wherein the first POS collimates a divergent beam emitted by the light source into a parallel or convergent beam.

16. The optical scanning unit of claim 11, wherein the second POS corrects the beam deflected by the beam deflector at different magnifications along the main scanning direction and the subscanning direction for focusing on the exposed object.

17. The optical scanning unit of claim 11, further comprising an f-θ lens that corrects the beam deflected by the beam deflector at different magnifications along the main scanning direction and the subscanning direction for focusing on the exposed object.

18. The optical scanning unit of claim 17, further comprising a third POS that is disposed in an optical path between the f-θ lens and the exposed object and is designed to maintain an optical path length of an incident beam while reducing the space occupied by the optical scanning unit.

* * * * *